(12) United States Patent
Boer et al.

(10) Patent No.: US 10,312,750 B2
(45) Date of Patent: Jun. 4, 2019

(54) METHOD AND DEVICE FOR DETECTING A DEVICE IN A WIRELESS POWER TRANSMISSION SYSTEM

(75) Inventors: Bart Michiel De Boer, Eindhoven (NL); Andries van Wageningen, Eindhoven (NL); Christoph Loef, Aachen (DE); Eberhard Waffenschmidt, Aachen (DE); Lennart Seboodt, Eindhoven (NL); Menno Anne Treffers, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 613 days.

(21) Appl. No.: 13/319,783

(22) PCT Filed: May 14, 2010

(86) PCT No.: PCT/IB2010/052142
§ 371 (c)(1),
(2), (4) Date: Nov. 10, 2011

(87) PCT Pub. No.: WO2010/136927
PCT Pub. Date: Dec. 2, 2010

(65) Prior Publication Data
US 2012/0068550 A1    Mar. 22, 2012

(30) Foreign Application Priority Data

May 25, 2009  (EP) .................................... 09160982
Jun. 30, 2009  (EP) .................................... 09164109
(Continued)

(51) Int. Cl.
*H01F 38/14* (2006.01)
*H02J 50/90* (2016.01)
(Continued)

(52) U.S. Cl.
CPC .............. *H02J 50/90* (2016.02); *H02J 7/025* (2013.01); *H02J 17/00* (2013.01); *H02J 50/12* (2016.02); *H04B 5/0037* (2013.01)

(58) Field of Classification Search
CPC ............... H02J 7/025; H02J 5/005; H02J 5/00
(Continued)

(56) References Cited

U.S. PATENT DOCUMENTS 4,354,488 A  10/1982  Bartos
4,890,609 A  1/1990   Wilson, II
(Continued)

FOREIGN PATENT DOCUMENTS

CN    1289180 A     3/2001
EP    2251954 A1    11/2010
(Continued)

OTHER PUBLICATIONS

Markus Böhm , "A system study for RFID-Transponders Based on Polymer Semiconductors", publish Aug. 10, 2007, p. 48-49 & fig. 2.21.*

(Continued)

*Primary Examiner* — Hal Kaplan
*Assistant Examiner* — Elim Ortiz
(74) *Attorney, Agent, or Firm* — Larry Liberchuk

(57) ABSTRACT

A method of detecting a receiver (214) by a transmitter and a transmitter for detecting a receiver are provided. The transmitter is intended to transmit power inductively to the receiver (214). The transmitter comprising a first transmission coil as a first electrode (204) and a second electrode (206). The first electrode (204) and the second electrode (206) form a capacitor (202). The method comprises the steps of applying a voltage (216) to any one of the electrodes (204, 206) and detecting a capacitance change of the capacitor (202).

15 Claims, 12 Drawing Sheets

(30) Foreign Application Priority Data

Jul. 2, 2009 (EP) .................................. 09164426
Jul. 13, 2009 (EP) .................................. 09165294

(51) Int. Cl.
*H02J 50/12* (2016.01)
*H02J 7/02* (2016.01)
*H02J 17/00* (2006.01)
*H04B 5/00* (2006.01)
*G01R 27/26* (2006.01)

(58) Field of Classification Search
USPC .................... 333/219; 320/108; 307/104
See application file for complete search history.

(56) References Cited

U.S. PATENT DOCUMENTS

| | | | |
|---|---|---|---|
| 5,474,060 A | 12/1995 | Evans | |
| 6,028,413 A | 2/2000 | Brockmann | |
| 6,856,291 B2* | 2/2005 | Mickle | H01Q 1/22 343/701 |
| 6,906,495 B2* | 6/2005 | Cheng | H01F 3/02 320/108 |
| 6,960,968 B2* | 11/2005 | Odendaal | H01F 17/0006 320/110 |
| 7,147,604 B1* | 12/2006 | Allen | A61B 5/0031 600/549 |
| 7,211,986 B1* | 5/2007 | Flowerdew | H02J 7/025 320/108 |
| 7,239,110 B2* | 7/2007 | Cheng | H02J 5/005 320/108 |
| 7,443,135 B2 | 10/2008 | Cho | |
| 2004/0000974 A1* | 1/2004 | Odenaal | H01F 17/0006 333/219 |
| 2004/0130915 A1* | 7/2004 | Baarman | A61L 2/10 363/21.02 |
| 2004/0130916 A1* | 7/2004 | Baarman | A61L 2/10 363/21.02 |
| 2004/0150934 A1* | 8/2004 | Baarman | H01F 5/02 361/115 |
| 2005/0007067 A1* | 1/2005 | Baarman | H01F 5/02 320/108 |
| 2005/0028811 A1 | 2/2005 | Nelson | |
| 2005/0122058 A1* | 6/2005 | Baarman | A61L 2/10 315/244 |
| 2005/0122059 A1* | 6/2005 | Baarman | A61L 2/10 315/244 |
| 2005/0127849 A1* | 6/2005 | Baarman | A61L 2/10 315/248 |
| 2005/0127850 A1* | 6/2005 | Baarman | A61L 2/10 315/248 |
| 2005/0127866 A1* | 6/2005 | Hamilton | G06K 7/10891 320/108 |
| 2005/0268914 A1 | 12/2005 | Paoluccio | |
| 2006/0191537 A1 | 8/2006 | Muellinger | |
| 2006/0249160 A1 | 11/2006 | Scarberry | |
| 2006/0270440 A1* | 11/2006 | Shearer | H02J 17/00 455/522 |
| 2008/0157909 A1 | 7/2008 | Chen | |
| 2008/0230072 A1 | 9/2008 | Rollins | |
| 2008/0319334 A1 | 12/2008 | Yamamori | |
| 2009/0096413 A1* | 4/2009 | Partovi | H01F 5/003 320/108 |

FOREIGN PATENT DOCUMENTS

| | | |
|---|---|---|
| FR | 2326944 | 10/1976 |
| JP | H0134837 Y2 | 10/1989 |
| JP | 2006288034 A | 10/2006 |
| JP | 2008032746 A | 2/2008 |
| JP | 2008173150 A | 7/2008 |
| WO | WO2004004118 A1 | 1/2005 |
| WO | WO2008050260 A1 | 5/2008 |

OTHER PUBLICATIONS

Kline, M. et al., "Capacitive power transfer for Contactless Charging" Applied Power Electronics Conference and Exposition (APEC), 2011 Twenty-Sixth Annual IEEE, pp. 1398-1404.

* cited by examiner

METHOD AND DEVICE FOR DETECTING A DEVICE IN A WIRELESS POWER TRANSMISSION SYSTEM

FIELD OF THE INVENTION

The invention relates to power transmission technology.

BACKGROUND OF THE INVENTION

To charge the batteries of battery-powered devices, such as cellular phones, PDAs, remote controls, notebooks etc., or directly power devices such as lamps or kitchen appliances, an inductive power system enabling a wireless power transfer can be applied. Inductive power systems for transferring power or charging mobile devices are, for example, known from WO 2008/050260. Such a system in general comprises a power transmitting device, hereafter called transmitter, comprising a plurality of transmitter coils which can individually be energized, thereby generating an alternating magnetic field. The inductive power system further comprises a power receiving device comprising a load requiring power. In order to receive power, the power receiving device is provided with a receiver coil, in which the alternating magnetic field, provided by the energized transmitter coils, induces a current. This current can drive the load of the receiving device, for example charge a battery or light a lamp. Hereafter a power receiving device is referred to as a receiver comprising a receiver coil and a load.

It is very important to enable a low, preferably (virtual) zero, standby power. For example, when there is no device on the wireless power transmitter, the power dissipation should be almost zero.

US patent application US2008/0157909 provides a system for detecting the coupling between a transmitter coil of the power transmitter device and a receiver coil of the power receiving device. While energizing the transmitter coil, a current sensor monitors the current through the transmitter coil to decide whether the receiver coil of the power receiving device is coupled to the transmitter coil. The system requires the energizing of the transmitter coil on a regular basis and results in too much energy consumption by the power transmitter device especially when no power receiving device is present.

If the system of said US patent application is used in the power transmitter device which comprises a plurality of transmitter coils, each one of the transmitter coils has to be energized on a regular basis, leading to a further increase of power usage. Further, the regular energizing of the transmitter coil introduces at regular instants an electromagnetic field which may cause, for example, electromagnetic interference, or may erase information on a magnetic strip, for example, of a bank card when the bank card is accidentally laid on the power transmitter device.

SUMMARY OF THE INVENTION

It would be advantageous to provide a method and a transmitter with low power consumption in standby mode.

A first aspect of the invention provides a method of detecting a receiver by a transmitter as claimed in claim 1. A second aspect of the invention provides a transmitter for detecting a receiver as claimed in claim 8. A third aspect of the invention provides a method of detecting a receiver by a transmitter as claimed in claim 12. A fourth aspect of the invention provides a transmitter for detecting a receiver as claimed in claim 13. Advantageous embodiments are defined in the dependent claims.

In accordance with the first aspect of the invention, a method of detecting a receiver by a transmitter is provided. The transmitter is intended to transmit power inductively to the receiver. The transmitter comprises a first transmission coil as a first electrode and comprises a second electrode. The first electrode and the second electrode form a capacitor. The method comprises a step of applying a voltage to any one of the electrodes, and comprises a step of detecting a capacitance change of the capacitor.

The present invention proposes a method of and a device for detecting whether the receiver is placed on the surface of the transmitter by capacitive detection, which is fast and does not interfere with inductive power transfer. Hence, detection of devices on a wireless charging pad is not interfered by another device already being charged on the same pad. Moreover, the proposed detection method works at little (or virtually no) power dissipation.

The method is based on the fact that a device that is placed on a surface of the transmitter will change the capacitance between two electrodes located below the surface of the transmitter, or between one electrode and ground, or between one electrode and the receiver. The placement of such devices on the transmitter surface changes the capacitances of the capacitors that exist between the different electrodes. This results from the induced change in dielectric constant of the space between the two electrodes, or in dielectric distance between the two electrodes, or a combination of a change in dielectric constant and dielectric distance. In the context of the invention, this method is also referred to as "capacitive detection method".

The detection of a capacitance change may be performed relatively power efficiently compared to inductive detection. As long as the capacitance does not change and when a DC voltage is used, no current flows from and to the capacitor—only when the capacitance changes a small amount of current flows from or towards the capacitor. Also if an AC voltage is applied to the capacitor and the AC voltage may be properly dimensioned, a relatively small amount of current flows through the capacitor. Thus, the current through the capacitor may be relatively small or substantially equal to zero and therefore the power consumption of the capacitive detection method is relatively low. The detecting may be performed power efficiently, for example, by means of a low power consumption integrated circuit. Thus, the method of detecting a receiver is relatively power efficient.

Further, capacitive detection does not require the inductive operation of the transmission coils and, thus, no electromagnetic field is generated and no electromagnetic interference is created.

Still further, the use of the first transmission coil as one of the electrodes reduces the number of components that are required to build a transmitter which uses capacitive detection to detect a receiver. Instead of introducing an additional first electrode and a second electrode, the method of the invention requires only the introduction of a second electrode, and therefore the transmitter has a less complicated design and saves costs.

In an embodiment, the transmitter further comprises a second transmission coil which acts as the second electrode. That is to say, two neighboring transmission coils can be used as two electrodes of a capacitor. The detection of the presence and location of a receiver coil can be done by means of measuring the capacitance change of the capacitor formed by two transmission coils.

A first transmission coil operates as a first capacitor electrode, which is connected to a first terminal. The neighboring transmission coil operates as a second capacitor electrode, which is connected to a second terminal. Another coil nearby operates for example as a third capacitor electrode, which is connected to a third terminal. The location of the receiver coil with respect to the location of the transmitter coils determines the capacitance between the first and second terminals, or, for example, between the first and third terminals.

In other words, the transmitter may have more than one transmission coil. Each pair of transmission coils of the transmitter may form a capacitor. By using a first transmission coil as the first electrode and the second transmission coil as the second electrode, an efficient use of components of the transmitter is realized. No additional electrodes have to be introduced in the surface of the transmitter, which prevents possible interactions between transmission coils of the transmitter and the additional electrodes.

If a receiver is placed on top of the first transmission coil, on top of the second transmission coil, or partly on the first transmission coil and/or partly on the second transmission coil, the capacitance of the capacitor formed by the two transmission coils changes, which is detected by the detection circuitry. Thus, the detection reveals that a receiver is placed on or close to the first transmission coil, and/or on or close to the second transmission coil. This knowledge may start a further process of receiver identification by the transmitter, or power transfer to the receiver may be started by the first transmission coil and/or the second transmission coil.

If the transmitter has a plurality of transmission coils and if between each pair of neighboring transmission coils the capacitance is monitored to detect changes in the capacitance, a reasonably accurate estimate of the location of the receiver with respect to the position of the transmission coils may be obtained. The detected position may be used to activate a further process of receiver identification or to start power transfer to the receiver by a transmission coil which is close or closest to the detected position of the receiver.

As an example of this embodiment, detection circuitry is connected to the second coil, and a voltage is applied to the first transmission coils, said detection circuitry being used for monitoring the capacitance change between the capacitor formed by the first coil and the second coil.

In another embodiment, the second electrode of the capacitance is positioned in the center of the first transmission coil.

The embodiment proposes to localize a receiver by using capacitive detection. The method will involve almost no power consumption, is fast and does not interfere with the inductive power transfer. The detection capacitor is realized between a primary coil as first electrode and a second electrode that is positioned in the center of the primary coil. The detection of a receiver therefore corresponds directly to the position of the power transmitter coil and requires a less complex localization algorithm.

In other words, the provision of an electrode in the center of the first transmission coil allows a more accurate detection of the position of the receiver with respect to the position of the first transmission coil. Especially, the transmitter is able to distinguish more accurately between a situation wherein the receiver is exactly positioned on top of the first transmission coil and another situation wherein the receiver partly covers the first transmission coil. If the receiver is positioned exactly on top of the first transmission coil, the capacitance change will be larger than in cases where the receiver is partially positioned on top of the first transmission coil.

Further, if the transmitter comprises a plurality of transmission coils, each transmission coil being provided with an electrode in the center of the transmission coil, each one of the transmission coils forms a capacitor with its central electrode. If a receiver is placed on the surface of the transmitter, one of the capacitors shows the largest change of its capacitance. Said capacitor is the capacitor formed by the transmission coil and its corresponding central electrode that is closest to the receiver. Thus, it is relatively simple to decide which transmitter coil is closest to the receiver.

The second electrode can have several shapes, including a round, oval, rectangular metal plate, possibly with slits to reduce Eddy currents, a coil, a set of thin conductors connected to each other at one side, etc. The second electrode may be positioned exactly in the center of the first transmission coil, however, to form a capacitor between the first transmission coil and the second electrode the second electrode may also be positioned off-center. It is only necessary that the second electrode is positioned within the first transmission coil.

As an example of this embodiment, detection circuitry is connected to any one of the electrodes of the capacitor, and a voltage is applied to the first transmission coils, the detection circuitry detecting the capacitance change between the capacitor formed by the first transmission coil and the second electrodes in the center of the first transmission coil.

A wireless power transmitter for detecting a receiver device, said transmitter comprising a first transmission coil as the first electrode of a capacitor and a second electrode of the capacitor positioned in the center of the first transmission coil, the transmitter further comprising detection circuitry connected to any one of the electrodes of the capacitor, said transmitter comprising:

a first unit for applying a voltage to the first transmission coils, detection circuitry for detecting the capacitance change of a capacitor formed by the first and second electrodes.

In an embodiment, a winding of the first transmission coil comprises an inner part of the winding and an outer part of the winding. The inner part of the winding is the first electrode and the outer part of the winding is the second electrode.

If the inner winding and the outer winding are, for example, in a standby mode of the transmitter device, disconnected from each other, the arrangement becomes a capacitive arrangement, where the inner part and the outer part are used as electrodes. The capacity between these electrodes increases if a device with capacitive properties is placed on top of the arrangement. By measuring the capacitance, using one of the described methods, a device can be detected. If a device is detected, the inner winding and the outer winding may become connected to operate the transmitter coil as an inductive power transmitter. No additional electrodes have to be provided in the surface of the transmitter. Using the inner winding and the outer winding allows accurate detection of the position of the receiver with respect to the position of the first transmission coil.

In a further embodiment, the detected capacitance change indicates that the receiver is in the proximity of the transmitter. The method further comprises the step of activating the transmitter so that the transmitter starts to communicate with the receiver or transmit power to the receiver.

The embodiment allows the transmitter to enter a low-power sleep state, from which it is woken up upon detection of an event related to a wireless power receiver. Such event can be the detection of a capacitive change.

In other words, when no receiver is detected, the transmitter is in standby mode, which means that no transmission coil is activated to transmit power or communicate with a receiver. If a capacitance change is detected, most probably the receiver is placed on the transmitter. Thus, the transmitter is woken up, which means that the standby mode is ended and that the transmitter enters an operational mode. In the operational mode the transmitter may inductively provide power to the receiver, or may first start with an additional communication process to further identify the receiver. In the operational mode, one or more transmission coils of the transmitter are used to inductively transfer power to the receiver, or inductively communicate with the receiver.

In an embodiment, the applied voltage is an AC voltage, or a DC voltage, or a voltage pulse, or a step function.

If a voltage, which is applied to one of the electrodes of the capacitor, is an AC voltage, a current flows through the capacitor which is proportional to the capacitance of the capacitor. By correctly dimensioning the value and the frequency of the AC voltage, the current may be relatively small, such that a small amount of power is dissipated. Changes in the current relate to a possible placement of a receiver on the transmitter. Detecting changes in a current, for example by detecting whether the current exceeds a predefined value, and/or by detecting whether the current decreases below a predefined value, is relatively simple and may be performed power efficiently.

If the applied voltage is a voltage pulse or a step function, the response of the capacitor in the time domain may be analyzed by the detection circuitry. Depending on the capacitance of the capacitor, a specific response may be detected. If the receiver is placed on the transmitter, the response is different from a situation in which the receiver is not placed on the wireless power device.

Measuring a characteristic of the response may be done by coupling a resistor in series with the capacitor and applying the voltage pulse or step function to the series arrangement. The voltage across the capacitance rises when the voltage changes form neutral to a predefined value, and depending on the predefined value of the voltage and the capacitance of the capacitor a specific rise may be measured. The capacitance increases when a device is placed, and therefore the rise time is longer if the device is placed. When a voltage pulse of a defined length is applied to the series arrangement, the voltage across the capacitor gradually decreases when the applied voltage falls from the predefined voltage to the neutral voltage. The decay time is a measure of the capacitance of the capacitor.

In a further embodiment, the transmitter comprises a plurality of capacitances formed by the first and second electrode pairs. The method further comprises the step of detecting the capacitance change of each one of the plurality of capacitors, and comprises the step of determining the position of the receiver depending on which one of the plurality of capacitors' capacitance change has been detected.

By providing a plurality of electrodes, each neighboring pair of electrodes forms a capacitor. By detecting a capacitance change between each one of the pairs of electrodes, the transmitter is capable of detecting relatively accurately where the receiver is positioned on the transmitter. The capacitances which have the largest change in capacitance are close to the receiver.

According to the second aspect of the invention, a transmitter for detecting a receiver is provided. The transmitter is intended to transmit inductively to the receiver. The transmitter comprises a first transmission coil as a first electrode and a second electrode. The first electrode and the second electrode form a capacitor. The transmitter further comprises a first unit for applying a voltage to any one of the electrodes, and detection circuitry connected to any one of the electrodes of the capacitance for detecting a capacitance change of the capacitor.

In an embodiment, the transmitter further comprises a second transmission coil being the second electrode.

In another embodiment, the second electrode is positioned in the center of the first transmission coil.

In a further embodiment, the detection of the capacitance change indicates that the receiver is in the proximity of the transmitter, and the transmitter comprises a second unit for activating the transmitter so that the transmitter may start to communicate with the receiver or transmit power to the receiver.

The transmitter and embodiments of the transmitter provide the same benefits as the method according to the first aspect of the invention and corresponding embodiments of the method according to the first aspect of the invention. The transmitter has similar embodiments with similar effects as the corresponding embodiments of the method.

According to a third aspect of the invention, another method of detecting a receiver by a transmitter is provided. The transmitter is intended to transmit power inductively to the receiver. The transmitter comprises a first transmission coil as an electrode. The method comprises the steps of applying a voltage to the electrode, and detecting a capacitance change of a capacitor formed by the first electrode and ground or formed by the first electrode and the receiver.

The first electrode forms a capacitance with ground or with a receiver. If a receiver comes in the proximity of the first electrode, the capacitance changes and a charge will flow towards the first electrode or away from the first electrode. By detecting the current to or from the first electrode, an effective and efficient solution for detecting the receiver is obtained which is not a complicated design and thus saves costs.

According to the fourth aspect of the invention, a further transmitter for detecting a receiver is provided. The transmitter is intended to transmit power inductively to the receiver. The transmitter comprises a first transmission coil as a first electrode, a first unit for applying a voltage to the electrode, and detection circuitry connected to the electrode for detecting a capacitance change of a capacitor formed by the electrode and ground or the electrode and a receiver.

In the context of this document, it is to be noted that the use of the word capacitor does not refer to a lumped capacitor. Further, transmitter, power transmitter and wireless power transmitter are interchangeable terms in the context of the invention. A characteristic of the transmitter is that the transmitter is intended for inductively transmitting power to a receiver. Receiver, receiver device and power receiver device are interchangeable terms in the context of the invention. A characteristic of the receiver is that the receiver is intended to inductively receive power. Further, the first unit for applying a voltage to any one of the electrodes or any one of the transmission coils may be a voltage source.

These and other aspects of the invention are apparent from and will be elucidated with reference to the embodiments described hereinafter.

It will be appreciated by those skilled in the art that two or more of the above-mentioned embodiments, implementations, and/or aspects of the invention may be combined in any way deemed useful.

Modifications and variations of the system and/or the method, which correspond to the described modifications and variations of the system, can be carried out by a person skilled in the art on the basis of the present description.

Figure 1:
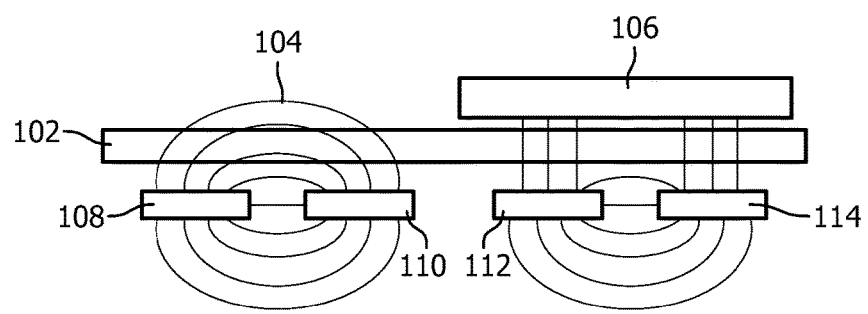
FIG. 1 depicts the principle of capacitive detection according to the present invention.

It should be noted that items denoted by the same reference numerals in different Figures have the same structural features and the same functions, or are the same signals. Where the function and/or structure of such an item have been explained, there is no necessity for repeated explanation thereof in the detailed description.

The Figures are purely diagrammatic and not drawn to scale. Particularly for clarity, some dimensions are exaggerated strongly

DETAILED DESCRIPTION

FIG. 1 depicts the principle of a method of detecting a device 106 that is placed on the surface 102 of the transmitter according to the present invention. Electrodes 108, 110, 112, 114 beneath the transmitter surface are used to detect devices 106 to be charged that are placed on the transmitter surface 102. The method is based on the fact that a device 106 that is placed on a surface 102 of a transmitter will change the capacitance between two electrodes 108, 110, 112, 114 located below the top surface 102 of a transmitter. The placement of such devices 106 on the transmitter surface 102 changes the value of the capacitance that exists between the different electrodes 108, 110, 112, 114. This results from the induced change in dielectric constant of part of the space between the two capacitor plates formed by the electrodes 108, 110, 112, 114, the dielectric distance of the two electrodes or a combination thereof. The change in capacitance is represented in FIG. 1 by the difference in the pattern of the electric field lines 104 between a covered and an uncovered surface.

For a parallel plate capacitor, the capacitance between the two electrodes is given by $$C = \frac{\varepsilon A}{d} \quad (1)$$

wherein $\varepsilon$ is the dielectric constant of the medium between the plates, A is the area of the plates and d is the distance between the plates. Hence, the capacitance is linearly dependent on the dielectric constant of the medium between the plates. For two plates in the same plane a more complex relation exists. However, the dependency on the dielectric constant remains. For a capacitor formed between two electrodes 108, 110, 112, 114 below the surface 102 of a transmitter, the dielectric constant will change (increase) when a device 106 is placed on the transmitter top surface 102. The resulting change in capacitance may be detected in several ways.

Figure 2A:
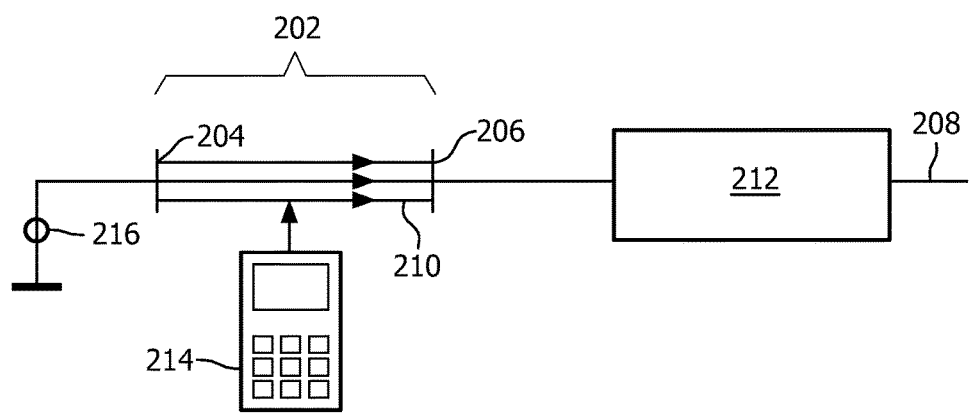
FIG. 2a depicts the basic structure for capacitive detection according to the present invention.

FIG. 2a depicts a method of detection according to an embodiment. A voltage source 216 is employed to apply a voltage, which may be an AC or DC voltage of an amplitude larger than or equal to zero, to one electrode 204 (representing one capacitor plate). Detection circuitry 212, connected to another electrode 206 (representing the second capacitor plate), is used to monitor the capacitance between the two electrodes 204, 206 forming a capacitor 202. A change in capacitance is indicative of device 214 placement and this event will be signaled by means of a detection signal 208. Lines 210 represent the electrical field lines between the electrodes 204, 206 of the capacitor 202.

When a DC voltage is applied across the capacitor 202 and when a device 214 is subsequently placed on the transmitter the charge redistribution results in a small current that can be detected as a voltage across a sense resistor.

The change in charge stored on the capacitor plate is given by $$\Delta Q = U \cdot \Delta C \quad (2)$$

wherein U is the DC voltage applied to the capacitor and ΔC is the change in capacitance upon placement of the device.

The resulting current is given by $$i = \frac{\partial Q}{\partial t} \quad (3)$$

wherein ∂Q/∂t is the charge per unit time flowing towards the capacitor plate. It is to be noted that charge redistribution will also occur when a device comprising a static charge is placed. Hence the detection signal may comprise a component as a result of a change in capacitance and/or a component as a result of placing a statically charged device.

When an AC voltage is applied across the capacitor 202, a current flows through the capacitor and the current may be monitored. When the capacitance increases upon placement of device 214, the amplitude of the current flowing will also increase, indicating the presence of the device 214. The current amplitude is given by $$i = u \cdot \omega C \quad (4)$$

wherein u is the applied AC voltage across the capacitor 202, ω is the frequency of the applied AC voltage and C is the capacitance between the electrodes 204, 206. Hence, the current depends linearly on the capacitance that changed upon device 214 placement. Note that the current can be kept arbitrarily small to limit power dissipation.

The method of detecting the receiver through a capacitance change is a so-termed analog ping method and is based on a change of the capacitance of an electrode on or near the interface surface, due to the placement of an object on the interface surface.

The method is particularly suitable for power transmitters that use free positioning, because it enables implementations that have a very low stand-by power, and yet exhibit an acceptable response time to a user. The reason is that (continuously) scanning the interface surface for changes in the arrangement of objects and power receivers thereon is a relatively costly operation. In contrast, sensing changes in the capacitance of an electrode can be very cheap (in terms of power requirements). Note that capacitance sensing can proceed with substantial parts of the base station powered down.

Power transmitter designs that are based on an array of primary (transmission) coils can use the array of primary coils as the electrode in question. For that purpose, the multiplexer should connect all (or a relevant subset of) primary coils in the array to a capacitance sensing unit—and at the same time disconnect the primary coils from the driving circuit. Power transmitter designs that are based on a moving primary coil can use the detection coils on the Interface Surface as electrodes.

It is recommended that the capacitance sensing circuit is able to detect changes with a resolution of 100 fF or better. If the sensed capacitance change exceeds some implementation-defined threshold, the power transmitter can conclude that an object is placed onto or removed from the interface surface. In that case, the power transmitter should proceed to localize the object(s) and attempt to identify the power receivers on the interface surface.

Figure 2B:
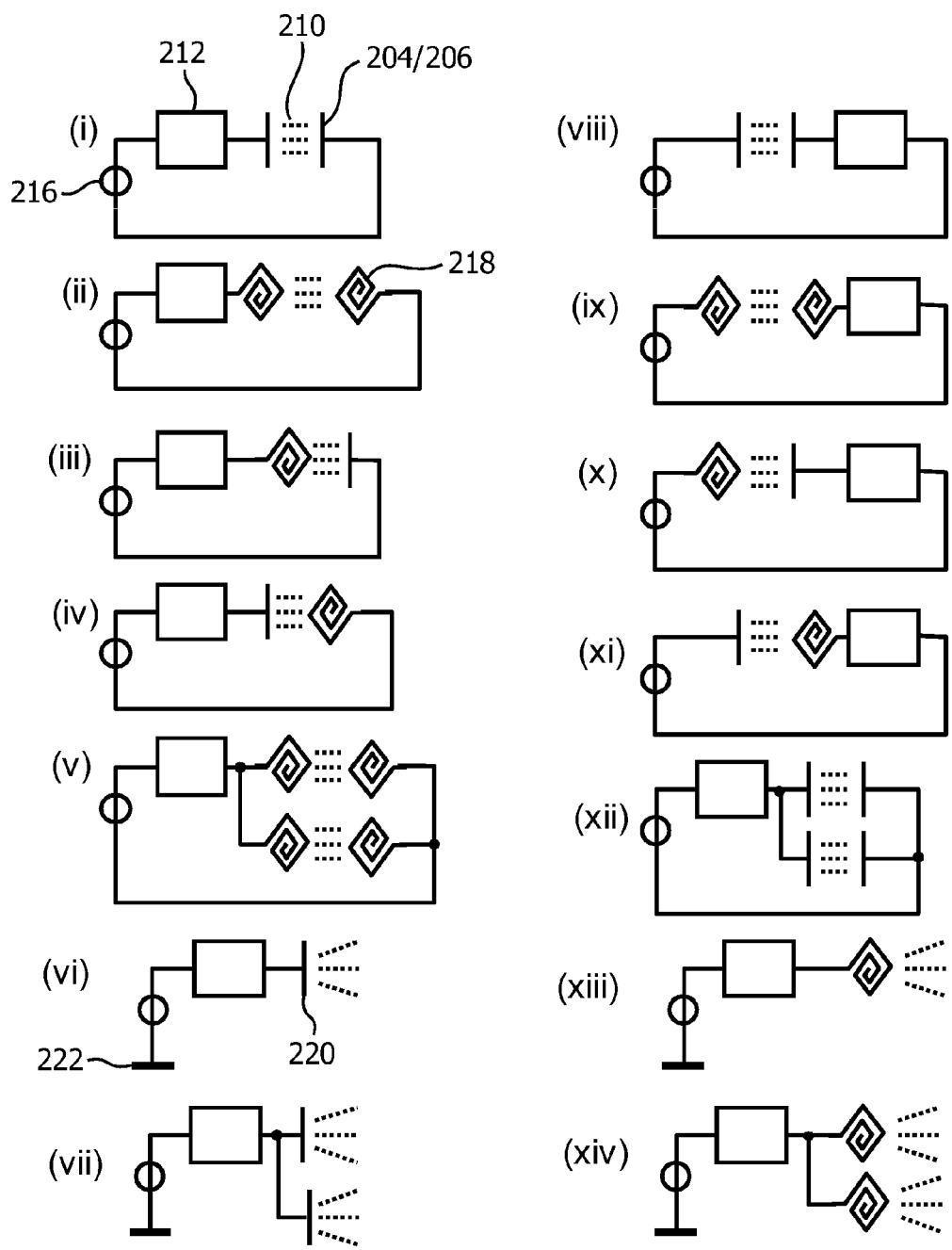
FIG. 2b depicts a plurality of different circuit topologies for the capacitive detection.

FIG. 2b depicts a plurality of alternative circuit topologies for the capacitive detection. In embodiment (i) two electrodes form a capacitor. In embodiment (ii) two transmitter coils 218 form the capacitor. Embodiments (i)-(iv) match with embodiments (viii)-(xi), respectively, and they differ with respect to the position of the detection circuitry 212. In embodiments (i) to (iv) the detection circuitry is connected to electrode 204, 206 to which also the voltage of the voltage source 216 is applied. In embodiments (viii)-(xi) the voltage source 216 is connected to another electrode of the capacitor than the detection circuitry 212. In embodiments (v) and (xii) is shown that a plurality of transmitter coils 218 or a plurality of electrodes 204, 206 may be configured such that they form a plurality of capacitors in a parallel configuration. It is to be noted that embodiments (iii), (iv), (viii) to (xi) may also have their respective counterpart wherein a plurality of capacitors are arranged in a parallel configuration.

Embodiments (vi), (vii), (xiii) and (xiv) of FIG. 2b show another aspect of the invention. The detection circuit 212 and voltage source 216 are connected to the same electrode 220. The electrode can be a dedicated electrode or can be formed by one or more transmitter coils. The capacitor formed by this electrode 220 and ground 222 is monitored by the detection circuit 212. The detection circuit 212 measures, at a predefined applied voltage which can be an AC voltage, a DC voltage or a pulse pattern, the current flowing towards the electrode 220, which is indicative of the capacitance. Upon device placement, the capacitance will change and therefore the current flowing towards the electrode will change. Hence, a sudden change in current flowing towards the electrode indicates device placement. In the embodiment (xiii) a transmitter coil is used as the single electrode, and in embodiments (vii) and (xiv) a plurality of electrodes and/or a plurality of transmitter coils are connected in parallel such that they each form a capacitor with respect to ground or the receiver.

Figure 3:
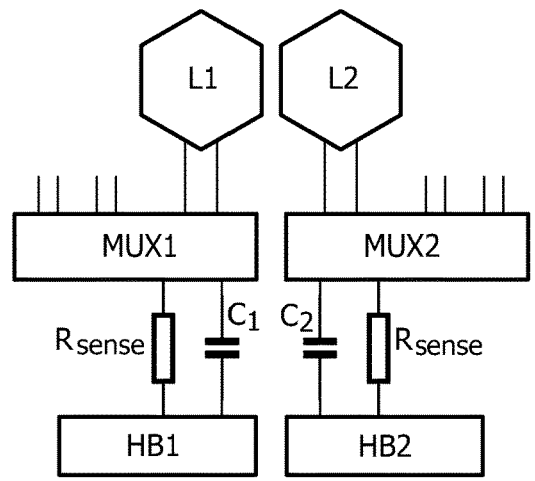
FIG. 3 depicts a block schematic representation system of a free positioning transmitter according to the invention.

FIG. 3 depicts a block schematic representation of an exemplary free positioning reference transmitter. In this Figure, hexagonal coils L1, L2 are used for power transfer and are located in the same plane next to each other. Although only two coils L1, L2 are shown, there are more coils (in fact the whole plane may be filled with coils) to enable free positioning of the receiver on the transmitter, i.e. multiplexers MUX1, MUX2 are used to select the coils located directly below the receiver for power transfer. The multiplexers MUX1, MUX2 connect the appropriate coil L1, L2 to a series capacitor C1, C2, such that the combination of coil L1, L2 and capacitor C1, C2 forms a resonant tank circuit required for efficient power transfer. The resonant tank is driven from a half-bridge circuit HB1, HB2. Finally, a sense resistor Rsense is used to monitor the coil current for control purposes.

Figure 4:
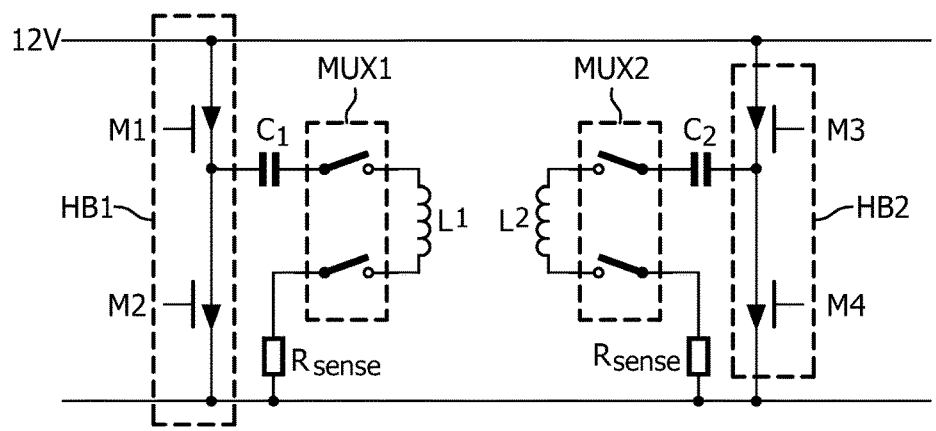
FIG. 4 depicts a schematic representation circuit of the system in FIG. 3.

FIG. 4 depicts a schematic representation of the system in FIG. 3. The half-bridge HB1, HB2 consists of two FETs M1, M2, M3, M4 that are driven from a microcontroller (not shown). The supply voltage applied to the half-bridge is generally between 12V and 16V. The multiplexer MUX1, MUX2 consists of switches that are used to connect the appropriate coil L1, L2 to the half-bridge driver.

Figure 5:
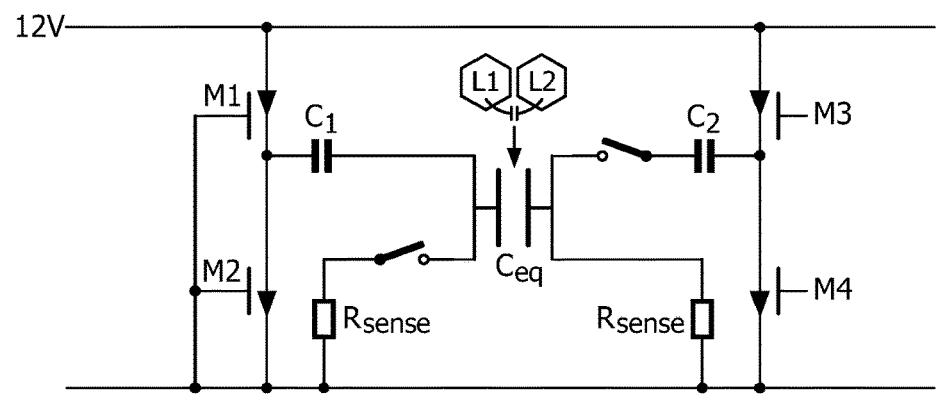
FIG. 5 depicts a circuit according to the first embodiment of the present invention.
Figure 6:
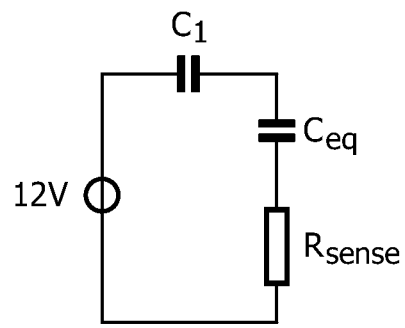
FIG. 6 depicts an equivalent circuit of FIG. 5.

Although for power transfer the coils L1, L2 are used as inductors, this invention aims at using two adjacent coils L1, L2 as the two plates of a capacitor. The value of this capacitor will change upon placement of a device on the transmitter surface. This value can be monitored using the same hardware as that used for power transfer. This is shown in FIG. 5. If the multiplexer switches are set and the FETs connected according to FIG. 5, the resulting equivalent circuit is shown in FIG. 6. The 12 V DC voltage applied will result in a DC voltage across the capacitor Ceq formed by the two coils L1, L2. No current will flow when in steady state operation, i.e. no power is dissipated. When a device is placed on the transmitter surface, a small current will flow towards the Ceq, which can be detected as a voltage across Rsense.

Figure 7:
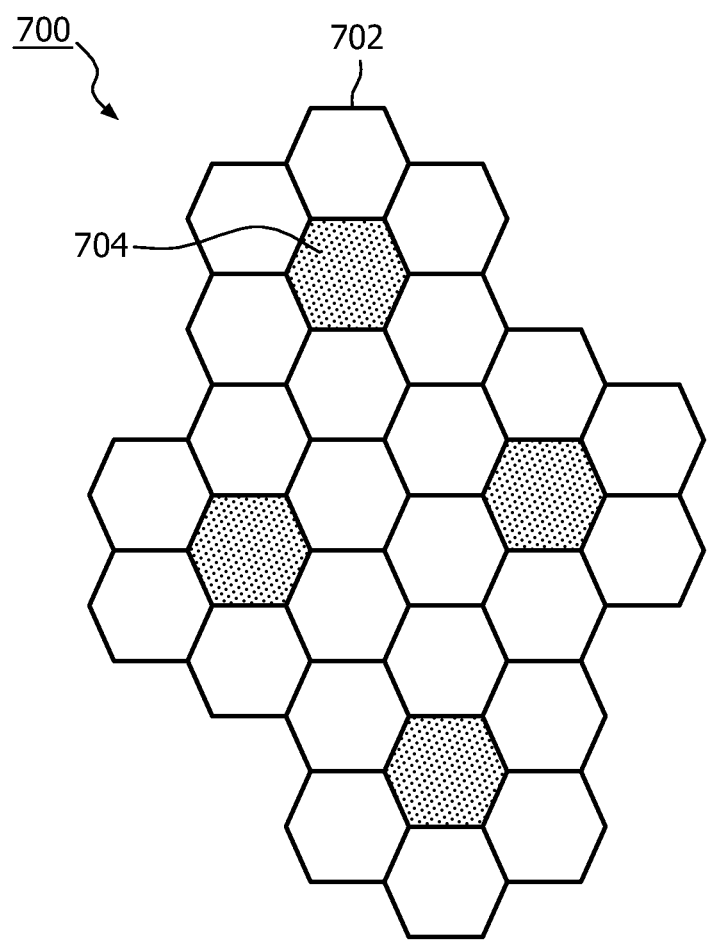
FIG. 7 depicts a transmitter surface covered by multiple coils.

A complete transmitter pad 700, consisting of a large number of coils, can be monitored simultaneously in convenient way. The coils on a transmitter surface are shown in FIG. 7. A DC voltage is applied to the grey coils 704 and the current is sensed (upon device placement) with white coils 702. In this way all the coils of the pad 700 can be sensed simultaneously, while still location information is obtained when a receiver device is sensed.

Figure 8:
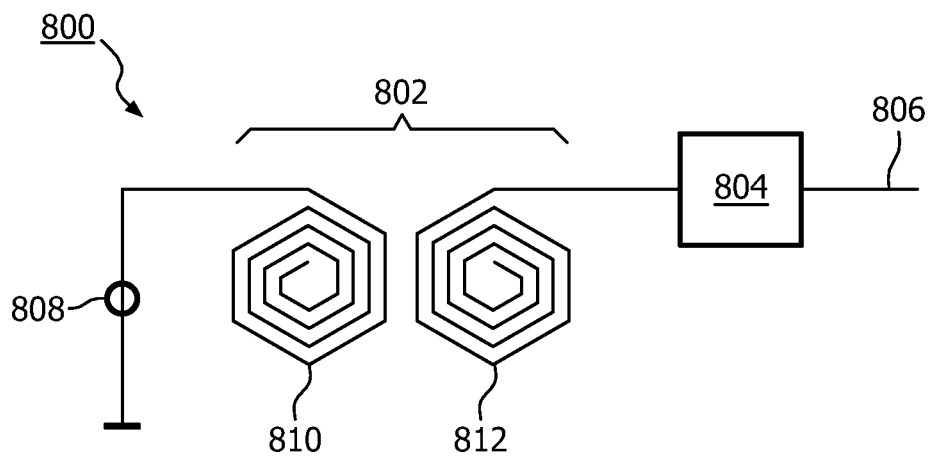
FIG. 8 depicts a capacitive detection system according to an embodiment.

FIG. 8 shows an embodiment according to this invention. In this embodiment two adjacent coils 810, 812 of a system 800, which are otherwise used for inductive power, form the capacitor 802. Using this embodiment, dedicated detection electrodes are not required. As opposed to a previously discussed embodiment, a dedicated voltage source 808 may be used and furthermore dedicated detection circuitry 804 is used. The voltage source 808 is employed to apply a voltage, which may be an AC or DC voltage of amplitude larger than or equal to zero. Depending on the applied voltage, suitable detection circuitry 804 is applied which generates a detection signal 806. Several of these detection circuits 804 may be used in parallel to obtain simultaneous detection and localization. The coils 810, 812 to which a voltage is applied may for instance be the grey coils in FIG. 7, while the coils connected to detection circuits 804 could be the white coils.

Figure 9:
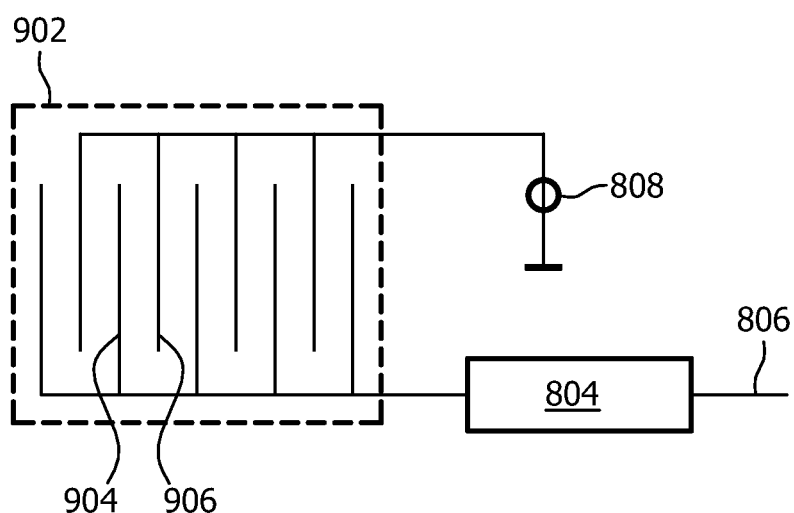
FIG. 9 depicts a capacitive detection system according to an embodiment.
Figure 10:
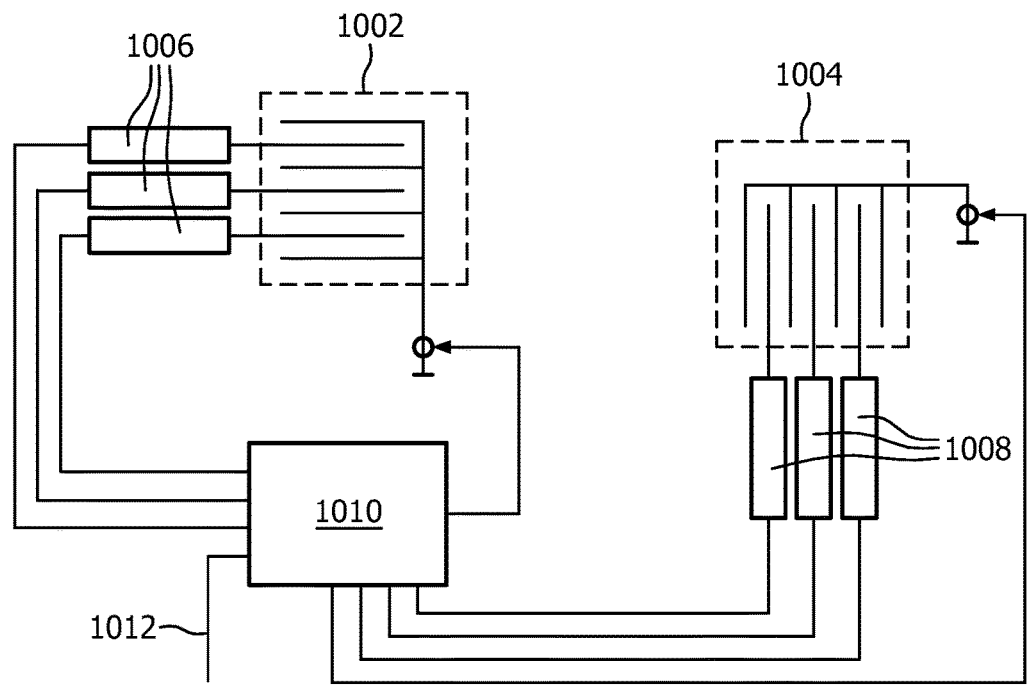
FIG. 10 depicts a capacitive detection system with localization according to another embodiment.

FIG. 9 shows another, third embodiment according to this invention. This embodiment uses dedicated detection electrodes 904, 906 and circuitry. Many configurations of electrodes 904, 906 are possible, which all fall within the scope of this invention. FIG. 10 depicts another example of an electrode configuration. In the example of FIG. 9 two interdigitated electrodes 904, 906 are used in the surface 902 of the transmitter device. The voltage source 808 is employed to apply a voltage, which may be an AC or DC voltage of amplitude larger than or equal to zero, and depending on the applied voltage, suitable detection circuitry 804 is used. Localization of the device on the transmitter surface 902, if required, may be performed using other (known) methods, like for instance by trying to communicate with the device via a local magnetic or electric field.

FIG. 10 shows another embodiment according to this invention. In this embodiment, electrodes are present in two layers 1002, 1004 below the transmitter surface. Dedicated detection circuitry 1006, 1008 is present for each possible horizontal and vertical position (layers 1002, 1004). A control system 1010 controls the applied voltages, processes the output signals of the detection circuits 1006, 1008 and generates the detection signal 1012 that now also conveys information about the location of the detected device. This electrode configuration has the advantage that the number of detection circuits 1006, 1008 scales with the square root of the transmitter area. However, other electrode configurations are possible that also allow combined detection and localization. These configurations all fall within the scope of this invention.

Combined detection and localization may alternatively be obtained by using a single detection circuit combined with a plurality of voltage sources applying voltages having location-dependent frequencies. The amplitude of the different spectral components in the detection signal then conveys detection and location information.

In the following, examples of detection circuits are presented. However, other implementations may also be used. These alternative circuits also fall within the scope of this invention.

Figure 11:
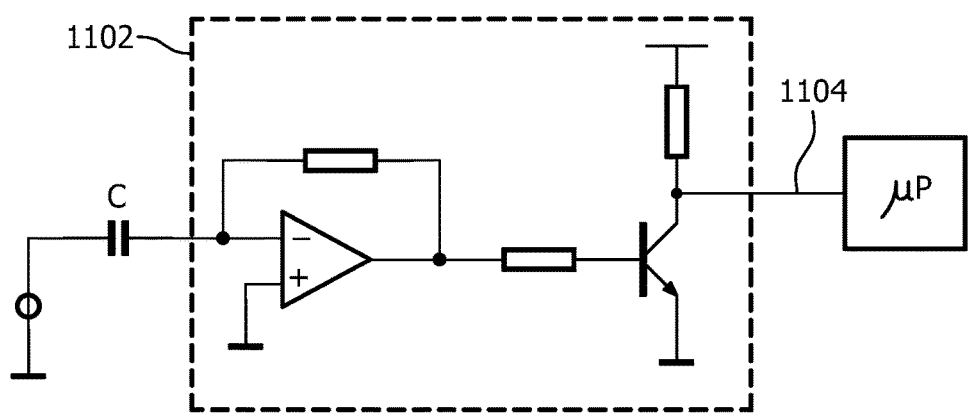
FIG. 11 depicts a first example of detection circuitry when a DC voltage is applied.

FIG. 11 depicts an implementation of the detection circuitry 1102 when a DC voltage larger than or equal to zero Volt is applied to one of the electrodes of the capacitor C. Upon device placement the value of C will change and, as result of the voltage across C being constant, the amount of charge on the capacitor plates will change. This flow of charge, or current, is supplied by an operational amplifier. In the configuration shown in FIG. 11, the current flowing towards C is also flowing through the feedback resistor of the op-amp, resulting in a voltage change at the output of the op-amp. Hence, the charge current is converted to a voltage. This voltage is amplified in the (NPN) transistor circuit, such that initially the detection signal 1104 is equal to the transistor supply voltage, while upon device placement the detection signal decreases to below 0.5 V. A microprocessor μP connected to the detection circuit 1102 can be configured such that it registers this change in voltage, which is indicative of device placement.

Figure 12:
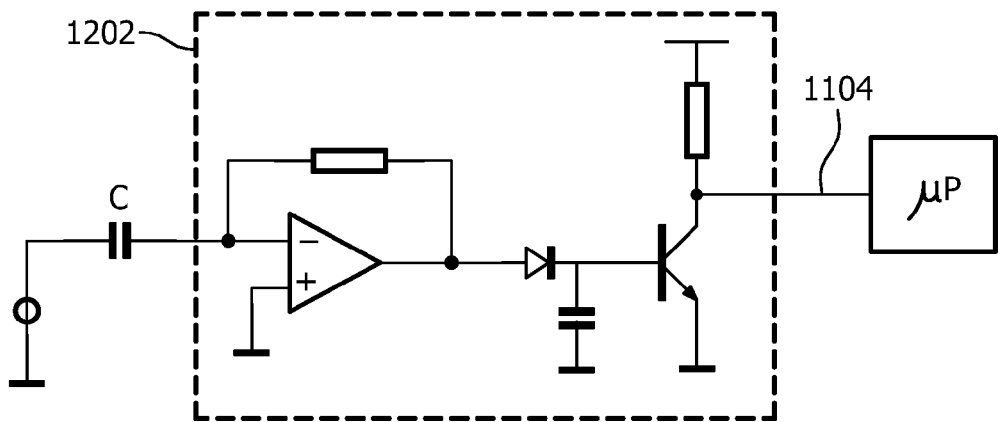
FIG. 12 depicts a second example of detection circuitry when a DC voltage is applied.

The circuit 1202 in FIG. 12 differs from that in FIG. 11 to the extent that a diode and capacitor are inserted in the base of the transistor. This capacitor is charged during the device placement and slowly discharged through the base of the transistor, thereby increasing the time that the detection signal 1104 is low, allowing easier detection of this state by the μP.

Figure 13:
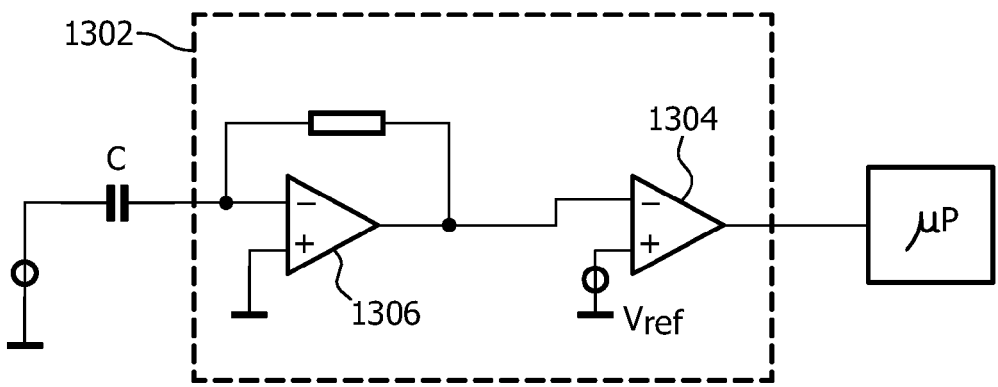
FIG. 13 depicts a third example of a detection circuitry when a DC voltage is applied.

The circuit 1302 of FIG. 13 differs from that in FIG. 11 to the extent that the transistor circuit is substituted by a comparator 1304 with a certain threshold voltage Vref. The output of the comparator 1304 is zero if the output voltage of the op-amp is smaller than Vref, and equal to its supply voltage if the op-amp 1306 output voltage exceeds Vref. The output of the comparator 1304 is monitored by a microprocessor μP. Optionally, a diode and a capacitor may be added between the output of the comparator 1304 and the input of the microprocessor μP to extend the duration of the detection signal.

Figure 14:
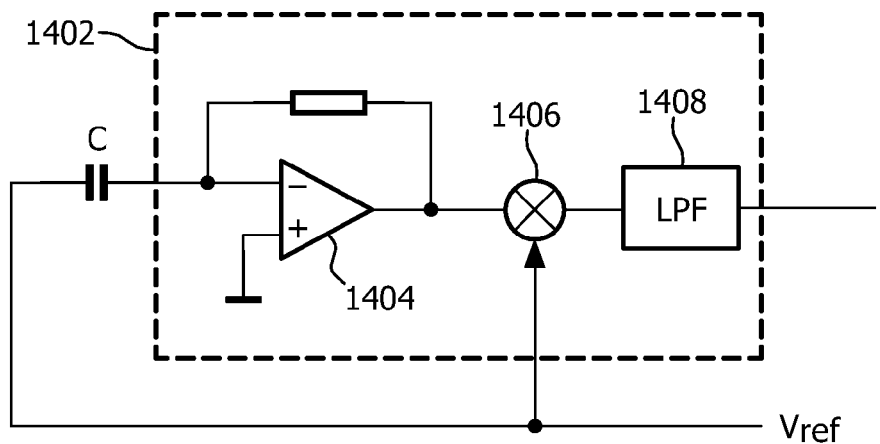
FIG. 14 depicts a fourth example of detection circuitry when an AC voltage is applied.

FIG. 14 depicts a detection circuit 1402 that is suitable if an AC voltage Vref is applied. The change in capacitance induced by the placement of a device results in a change in amplitude of the output signal of the op-amp 1404. This amplitude is obtained by subjecting this op-amp 1404 output signal to demodulation in a demodulator 1406 and filtering in a low pass filter 1408.

Figure 15:
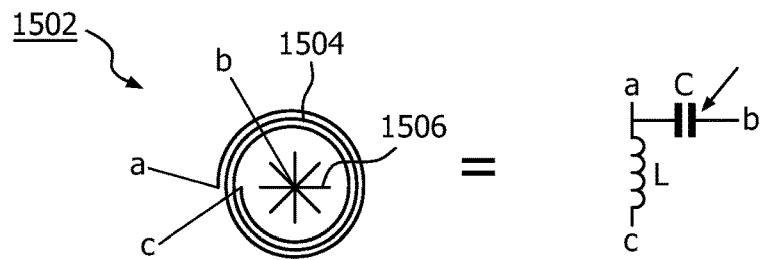
FIG. 15 depicts an example with a star-shaped electrode in the center of a primary coil.

A detection capacitor 1502, which is for example shown in FIG. 15, is realized between a primary coil 1504 as first electrode and a second electrode 1506 that is positioned in the center of the primary coil 1504. The second electrode can have several shapes, including a round, oval, rectangular metal plate, possibly provided with slits to reduce Eddy currents, a coil, a set of thin conductors, connected to each other at one side, etc.

FIG. 15 shows an example with a star-shaped electrode 1506 in the center of a primary coil 1504. The Figure also shows on the right-hand side a symbolic representation of the detection capacitor formed between the primary coil 1504 and the second electrode 1506.

When a device is placed on or removed from the primary coil 1504, the value of the capacitor C changes. The value increases significantly when a device covers the second electrode 1506 of C (placed in the center of the primary coil 1504) and at least part of the primary coil 1504. The capacitance does not increase much when the device does not cover the second electrode 1506 of C. The capacitor C is therefore well suited to detect whether a device is positioned on top of a primary coil 1504.

Figure 16:
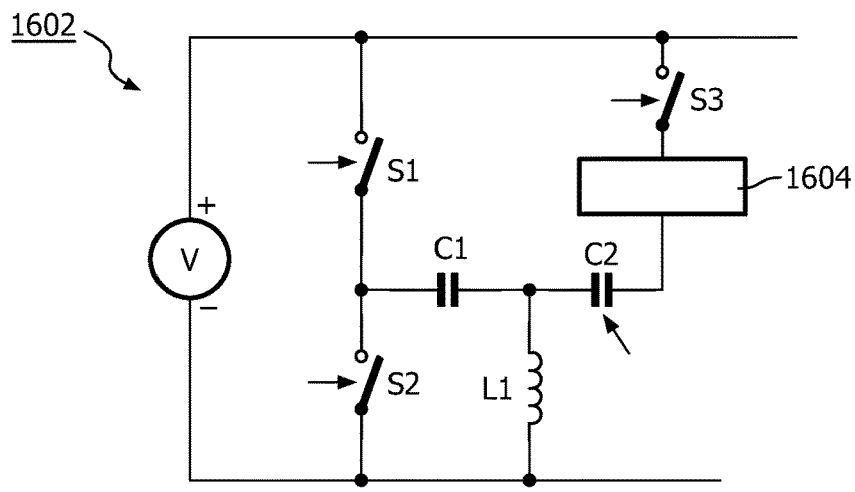
FIG. 16 depicts a transmitter with a single coil represented by L1 and a detection capacitor.

FIG. 16 shows transmitter circuitry 1602 with a single coil represented by L1 and a detection capacitor C2. A serial resonance circuit is formed by L1 and C1. The resonance circuit is driven by a half bridge inverter represented by the switches S1 and S2. A detection unit 1604 is connected via switch S3 to detect a change in the current to C2. During detection, the switches S1 and S2 are both open, or at least one is open and the other one is closed, while S3 is closed. During power transfer, S3 is open and S1 and S2 are closed in alternation. When a device is placed on or removed from the primary cell, the value change of C2 results in a small current towards/from C2 to be measured by the detection unit 1604.

The direction of the current caused by the change of the capacitance of C2 can be applied to determine the direction of the movement of the device in relation to the primary cell. If a device is moved towards the transmitter cell, the capacitance will rise, resulting in a positive current. If the device is removed from the cell, the capacitance will decrease, resulting in a negative current.

The transmitter can be equipped with a matrix of primary cells, wherein each primary cell contains at least a primary coil, a detection capacitor and a detection unit. Alternatively, all detection capacitors are connected in parallel to one detection circuit. In this case no localization information is obtained. The transmitter can determine the position and shape of a device that is placed on the surface of the transmitter, by examining which detection units have measured an increase of the capacitance C2. The resolution of such localization is determined by the physical size of the transmitter coils and the sensitivity of the detection units.

Figure 17:
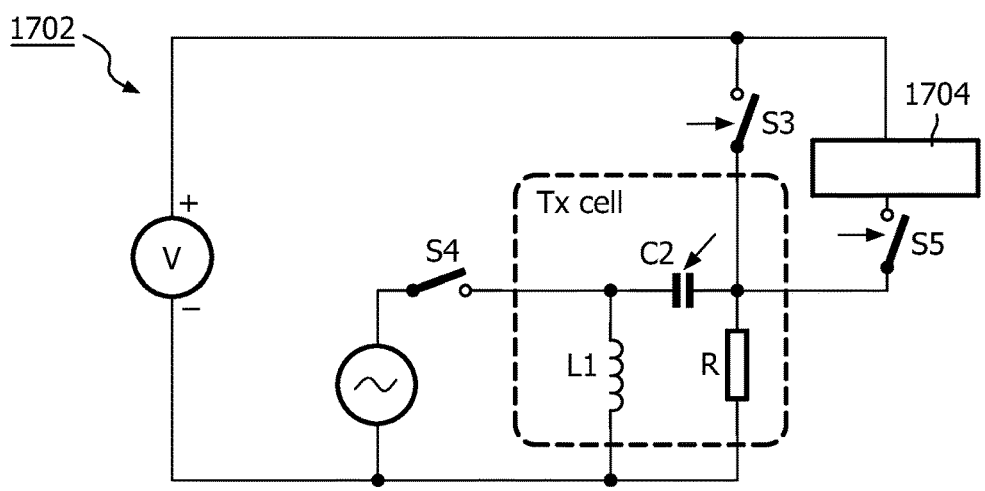
FIG. 17 depicts an embodiment where the detection unit measures a voltage instead of a current.

FIG. 17 shows a circuitry 1702 embodiment where the detection unit 1704 measures a voltage instead of a current. To be able to make use of a central detection unit 1704 and a central power signal generator serving multiple primary cells, switches S4 and S5 are added. This allows to equip the transmitter with a more advanced and costly implementation of both the signal generator and detection unit 1704, as a result of which the cost per primary cell is only moderately increased.

S4 can be part of a multiplexer allowing selective connection of a primary cell to a central oscillator. S5 can be part of a multiplexer allowing selective connection of a primary cell to a detection unit.

During power transfer S4 is closed while S3 and S5 are open. During localization of a device, on the transmitter, the switch S4 is open for each primary cell that is involved in the localization. To examine a change of device localization, the following is repeated cyclically for each involved primary cell, using a predefined cycle time.

At the beginning of the cycle, the capacitor C2 of the primary cell is charged with a DC voltage by closing the switch S3 for a short period of time.

During the cycle, the capacitor discharges via a (parasitic) resistor R of a known high value.

At the end of the cycle, the voltage change is measured by a detection unit. Switch S5 is closed for this purpose.

The following situations should be differentiated:

If no device was present on top of the primary cell and no device is placed on the primary cell, the capacitance of C2 is not changed and the measured voltage will be within a pre-defined range according to the discharging of the capacitor over the resistor within the cycle time.

If no device was present on top of the primary cell and a device is placed on the primary cell, the capacitance of C2 is increased and the measured voltage will be below a pre-defined range according to the discharging of the capacitor over the resistor within the cycle time If a device was present on top of the primary cell and the device has been removed from the primary cell, the capacitance of C2 is decreased and the measured voltage will be above a pre-defined range according to the discharging of the capacitor over the resistor within the cycle time If a device was present on top of the primary cell and the device has not been removed from the primary cell, the capacitance of C2 is not changed and the measured voltage will be within a pre-defined range according to the discharging of the capacitor over the resistor within the cycle time.

A further method of detecting and localizing a device measures the capacitance of C2 by using an AC instead of a DC source.

The described method can be applied to detect and localize devices on a transmitter in order to select one or more transmitter coils for power transfer to a receiver.

The described method can be applied in conjunction with an existing detection and receiver localization method that requires a power signal on a transmitter coil that lasts relatively long in order to wait for a response of a receiver to the power signal (e.g. by providing data using load modulation). In this case the described method can limit the number of transmitter coils that need to be examined by the existing method, causing a limitation of the total power and time for examining the transmitter coils upon a response of a receiver.

Figure 18:
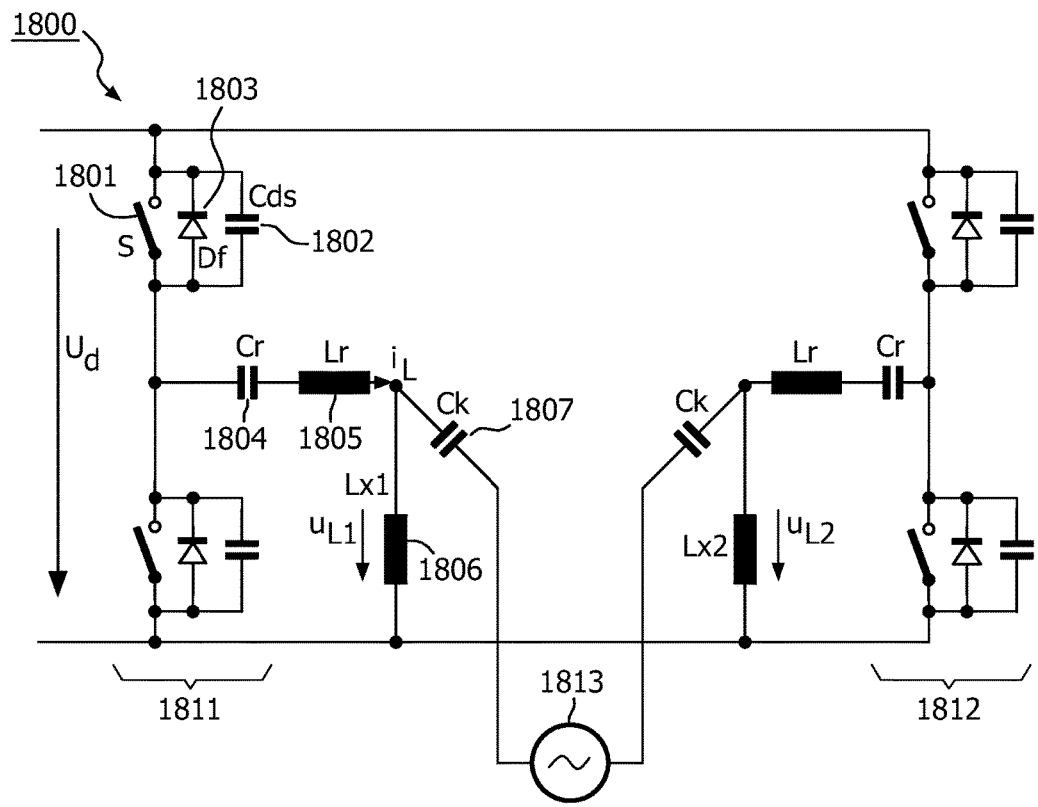
FIG. 18 depicts an outline of the capacitance measuring circuit between two coils.

In FIG. 18 an outline of a transmitter circuit 1100 is shown for detecting the capacitance between coils Lx1, Lx2. The circuit consists exemplarily of two half bridges 1811, 1812. Each one of the half bridges is exemplarily equipped with two MOSFET Switches. Each switch consists of an active controllable path 1101 which embraces a capacitance Cds 1802 and a freewheeling diode 1803. The center tap of the half bridge is connected to a transmitter coil Lx1 1806, Lx2 via a resonance capacitor Cr 1804 and optionally a series inductance Lr 1805. The resonance frequency of the circuit is determined by the capacitance, the series inductance and the leakage inductance of the transformer.

In FIG. 18, exemplarily, two half bridges 1811, 1812, which supply the ac-voltage to the resonant circuit during power transmission, are depicted for explanation purposes. A higher number of transmitter coils and supply circuits may be used in an arrangement as shown in FIG. 7.

In FIG. 18 the transmitter coils Lx1, Lx2 are supplied by means of half bridges 1811, 1812. This arrangement is used for explanation purposes. Other arrangements for the ac-voltage supply (for example full bridge arrangement or a Class-A/B analog amplifier) are thinkable.

Figure 19:
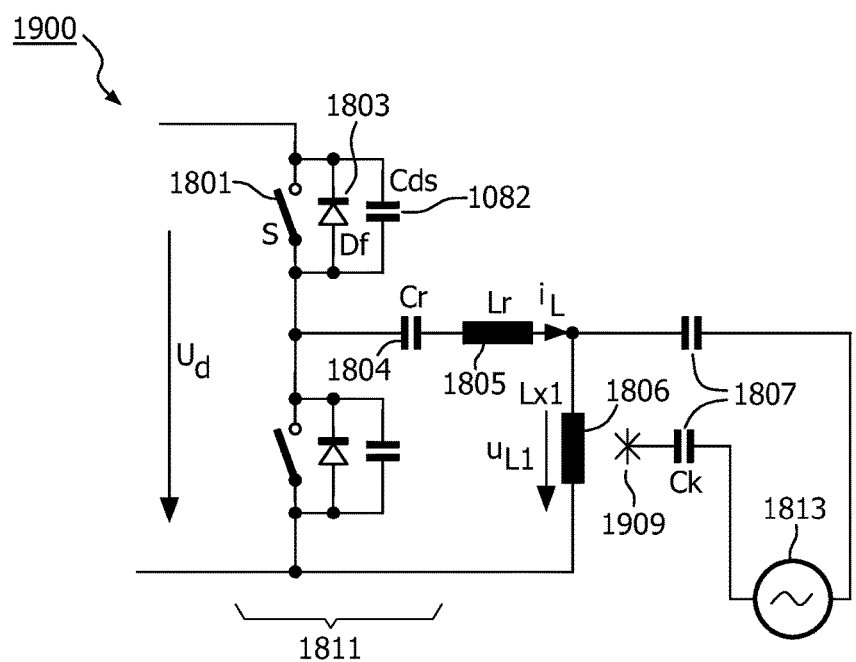
FIG. 19 depicts a basic outline of the capacitive measuring circuit between a coil and a centered electrode.

In FIG. 19 an outline of a second transmitter circuit 1900 is shown for detecting the capacitance between a transmitter coil 1806 and an electrode 1909 positioned in the center of the transmitter coil 1806.

In a further embodiment, the self-capacitance of the transmitter coils is measured. Since it is a planar coil, the self-capacitance increases if a device with capacitive properties is placed on the transmitter coil. The self-capacitance can e.g. be measured by measuring the self-resonance of the transmitter coil. If the self-resonance decreases below a pre-defined reference frequency, a device is detected. To measure the self-resonance, several methods are known in the art.

In a further embodiment, the transmitter winding is split into an inner and an outer part of the winding. Both parts are located concentrically in the same horizontal layer. They are connected by a switch (e.g. a transistor). If the switch is open, the arrangement becomes a capacitive arrangement, where the inner part and the outer part are used as electrodes. The capacity between these electrodes increases if a device with capacitive properties is placed on top of the arrangement. By measuring the capacity using one of the described methods, a device can be detected. If a device is detected, the switch is closed to operate the transmitter coil as an inductive power transmitter.

In an embodiment the capacitance is measured in the frequency domain. The embodiment described implies two capacitances Ck 1807 at the terminals of each involved transmitter coil 1806. To measure the capacitance between the exemplarily shown two coils as shown in FIG. 18 the terminals of both coils are connected in an identical way. A capacitance measuring unit 1813 is located at the junction points of the coupling capacitors Ck 1807. To measure the capacitance of a coil and its centered electrode 1909 as shown in FIG. 19, the capacitance measuring unit 1813 is located between the junction point of the coupling capacitors Ck 1807 and its centered electrode 1909. Preferably the measurement frequency is different from the operation frequency of the transmitter coil. The method described herein uses a low-cost dedicated capacitance measurement unit 1813.

The driver half-bridge plus an additional resistor can be used to fulfill the capacitance measurement. The individual coils which are addressed in one measurement cycle are decoupled by means of a multiplexer which may comprise relays. The ac-measurement is done by providing an ac-voltage to one capacitance terminal (which is given by a first winding coil). The ac-frequency is generated by means of the transmitter coil driver. However, a high frequency, preferably in the low MHz-range, is suitable for capacitance measurement. Thus, the frequency limitation or the transmitter coil driver has to be validated.

The capacitance measurement is done more accurately by means of a capacitance measurement circuit 1813. This measurement unit 1813 is connected to the transmitter coils via a capacitance 1807.

The series inductance Lr 1805 decouples the high frequency used for the capacitance measurement from the switch parasitic capacitances Cds 1802.

The capacitance between two coils Lx1, Lx2, or between a coil Lx1, 1806 and its centered electrode 1909 will change when an object, implying a certain electrical conductivity or showing a high permittivity, is placed on, or removed from the transmitter coil(s).

Connecting the coils in the way shown in FIG. 18 and FIG. 19 will provide a capacitive coupling to the winding and will avoid disturbances caused by external influence.

The capacitance measured by unit 1813 in FIG. 18 indicates whether a receiver coil is covering (part of) two transmitter coils Lx1, Lx2, or not. By measuring the capacitance between each neighboring pair of transmitter coils Lx1, Lx2, the transmitter can calculate the location of a receiver coil, e.g. by summing up the measured capacitance for each transmitter cell towards its neighbor transmitter coils. This method works as long as the receiver coil is at least covering part of two transmitter coils (e.g. when the receiver coil is larger than each transmitter coil)

The capacitance measured by unit 1813 in FIG. 19 indicates whether a receiver coil is covering (part of) the transmitter coil and its centered electrode. This method indicates directly if a receiver coil is positioned above a transmitter coil and can also be applied if the receiver coil is covering (a part of) one transmitter coil only.

In another exemplary embodiment, the capacity between the electrodes is measured by applying a pulse or a step function to the capacitive arrangement to measure the capacitance in the time domain. The pulse generator is connected to the capacitive arrangement with a defined resistor in series. The voltage between the electrodes is measured.

In an exemplary embodiment, a step function is applied to the circuit after the capacitance arrangement is discharged. This can be approximated by a pulse, which is sufficiently long to be considered as a step function for all cases that may possibly occur. The rise time and the decay time of this voltage depends on the capacitance of the capacitive arrangement and can thus be related to the presence of an object between the electrodes of the capacitive arrangement. The rise time of the electrode voltage is measured by comparing the electrode voltage to a reference voltage using a comparator. A controller can measure the time from the beginning of the step function to the time when the comparator changes its output. If this time exceeds a pre-defined value, a device is detected. The reference value can be adapted continuously by the control algorithm.

In a further exemplary embodiment, a pulse of defined length and amplitude is applied after the capacitive arrangement is discharged. In detail, the pulse shape and length is selected such that the amount of charge delivered to the electrodes is well defined. After the pulse is applied, the voltage at the electrodes is measured and compared to a reference value. If the capacitive arrangement has a low capacitance, which corresponds to "no device on top", the resulting voltage is high. If a device with capacitive properties is placed on the arrangement, the arrangement has a high capacitance. Then the resulting voltage is low. Thus, if the measured voltage is below a reference value, a device is detected.

Figure 20A:
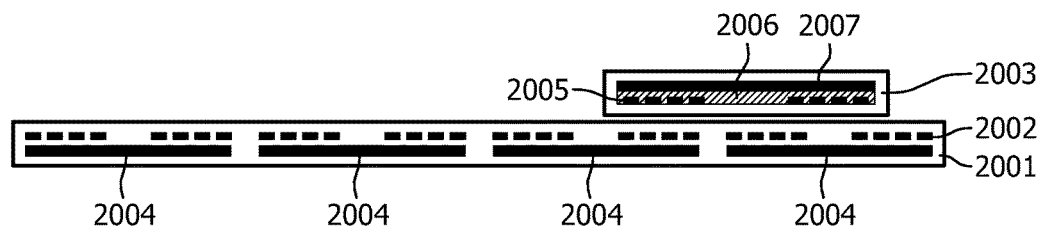
FIG. 20a depicts a mechanical outline with implemented capacitance.
Figure 20B:
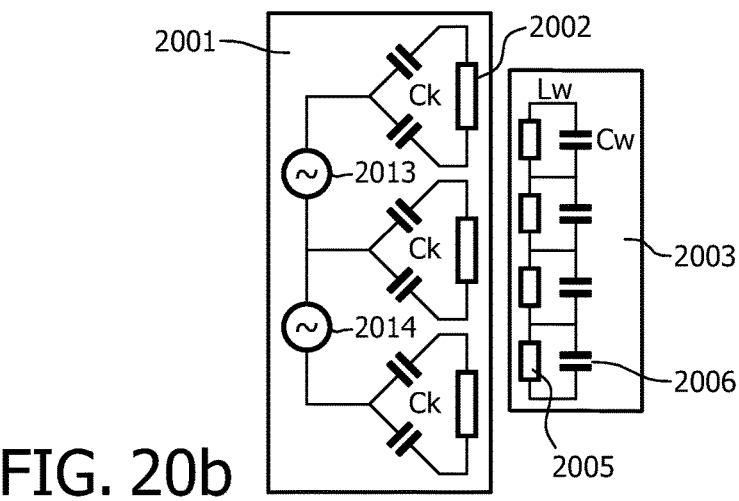
FIG. 20b depicts an equivalent electrical circuit of the described measurement method.
Figure 20C:
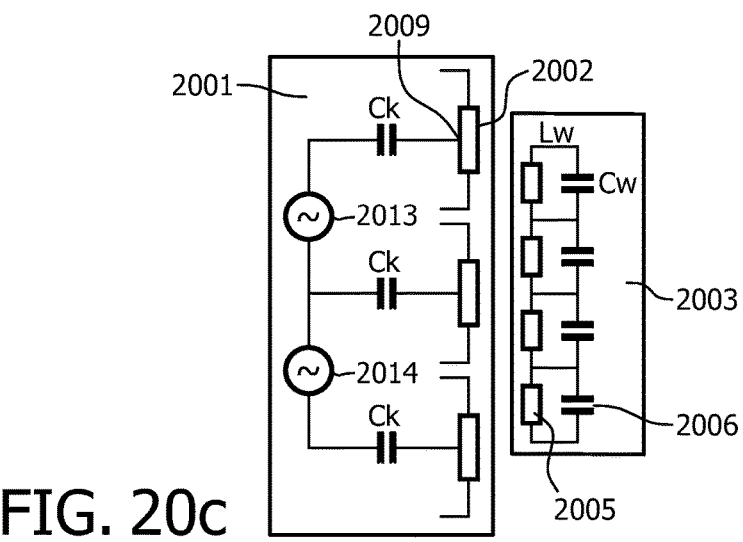
FIG. 20c depicts an equivalent electrical circuit of the described second embodiment of the measurement method.

A further embodiment is shown in FIGS. 20a, 20b, 20c.

If an object with high permittivity, (but which is not a receiver coil) is placed on the transmitter coil(s), the value of the measured capacitance will change as well. Placing, for example, a key on the surface will influence the capacitance between the coils or between a coil and its centered electrode also. In both mentioned cases the transmitter coils will not start to transmit power, since the units placed on the surface are not valid units to receive powered.

To distinguish and identify a receiver coil two methods may be used.

Figure 21:
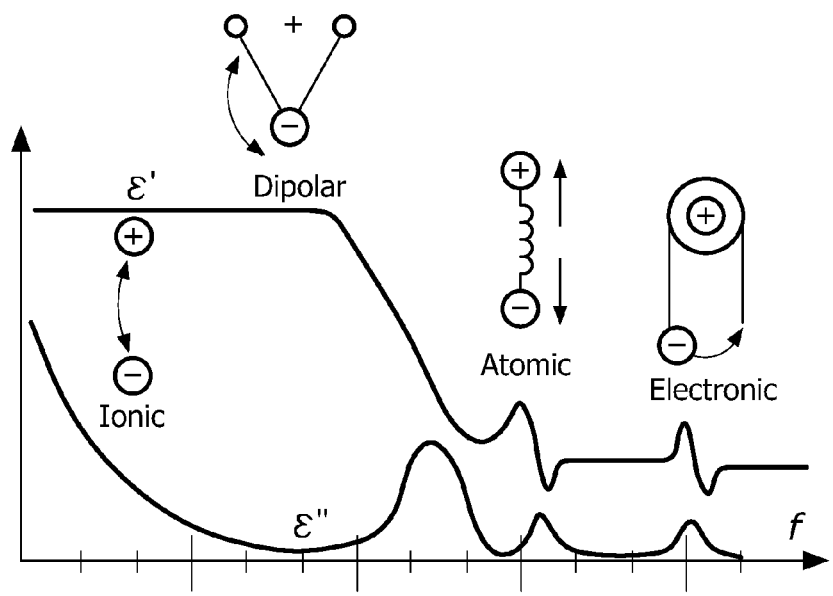
FIG. 21 depicts a plot of the dielectric permittivity spectrum over a wide range of frequencies. The real and imaginary parts of permittivity are shown, and various processes are depicted: ionic and dipolar relaxation, and atomic and electronic resonances at higher energies.

An embodiment to identify a valid receiver uses the dielectric material properties of the receiver. The embodiment consists of a dedicated material around or, at least, at the lower surface of the receiver, which has a defined frequency behavior. This can be achieved by providing a housing (for example of plastics) which has a frequency-dependent impedance. The frequency-dependence can be achieved by using the Debye relaxation, which is the dielectric relaxation response of an ideal, non-interacting population of dipoles to an alternating external electric field. Knowing the housing material of the receiver coil, detection and specially identification of the housing can be carried out. In FIG. 21 the dielectric permittivity spectrum over a wide range of frequencies is shown. The real and imaginary parts of permittivity are shown, and various processes are depicted: ionic and dipolar relaxation, and atomic and electronic resonances at higher energies. Knowing the special frequencies of the electronic, atomic, dipole and ionic relaxation frequencies, the material can be identified. Using dedicated materials, the material-specific relaxation frequencies can be set to a desired frequency. Preferably the identification is done at frequencies which are different from the operation frequency of the coil/power transfer operation.

Another embodiment to identify a valid receiver uses a frequency-dependent electric permittivity, which will change with frequency without using the Debye relaxation effect. This can be realized by adding a dedicated material between the receiver coil and the housing. The set-up is shown in FIGS. 20a, 20b, 20c.

The system consists of a transmitter coil array housing 2001 in which the transmitter coils 2002 are located. Each transmitter coil consists optionally of a magnetic core 2004 which improves the magnetic flux characteristic of the transmitter coils. The magnetic core can be either individual for each core or a common magnetic backplane can be implemented.

In another embodiment to identify a valid receiver, the receiver winding 2005 is embedded in and electrically connected to a material 2006 with a defined electric permittivity. Thus, the receiver winding acts as an inductance/capacitance network. The equivalent electrical circuit is shown in FIG. 20b.

For explanation purposes only three transmitter coils and one receiver coil are shown in the Figure. However, more than three transmitter coils and/or receiver coils are thinkable. The drawing is rotated counter-clockwise.

The transmitter coils 2002 and the capacitance measurement unit 2013, 2014 are located in the transmitter housing 2001. The receiver coils 2005 are located in the receiver housing 2003. Each winding turn Lw has a defined capacitance Cw which determines in total a specific resonance frequency. With respect to the location of the receiver coil, the measured capacitance between the first winding and the second winding will differ from the capacitance measured between the second and third winding. Only the capacitance measurement between the windings is part of this embodiment. Changing the measuring frequency will show the frequency-dependence of the measured capacitance. Since the impedance will change with respect to the frequency, the presence of a receiver can be distinguished from the presence of other items placed on the transmitter array. The specific frequency-dependence can be used as a key. If different types of receivers (for example different power demands/characteristics) are placed on the transmitter array, they can be identified and addressed in terms of power demand or charging demand individually. In this embodiment the capacitance measurement frequency and the frequency at which the frequency-dependency of the receiver coil changes is different from the operating frequency when supplying power to the receiver coil.

The capacitances added to the receiver coils may be smaller than a series capacitance, which may be applied in addition to the receiver coil. Thus, the embedded capacitance will not influence the power transmission characteristic.

In the outline described above, the unit to measure the capacitance/frequency dependence of the device is connected at the winding terminals of the transmitter coil. Alternatively, the measurement unit can be connected to the center-tap of each of the transmitter coils. This outline is shown in FIG. 20c.

Figure 22:
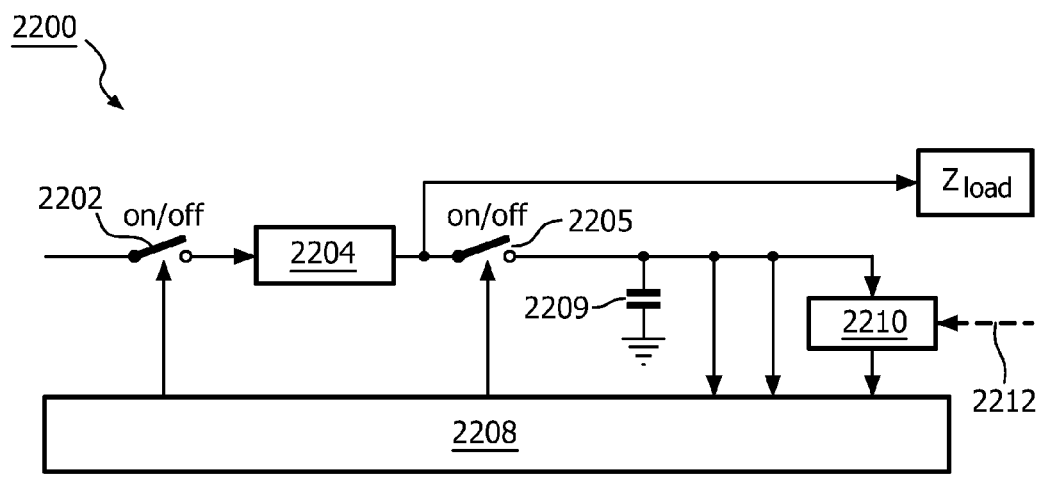
FIG. 22 depicts a low standby power architecture, FIG. 23 schematically shows a flow diagram of the method of the invention.

FIG. 22 depicts a low standby power architecture 2200. In this architecture 2200, the bias supply 2204 which often dominates stand-by power dissipation is switched off by means of an AC switch 2202 when the transmitter is in sleep state (i.e. standby mode). During this state, only the controller 2208 and the detection circuits 2210 are powered from the energy stored in a capacitor 2209. This subsystem is separated from the rest of the transmitter electronics by means of a switch 2205 to ensure that only these two components are powered from the storage capacitor 2209. A small program running on the controller 2208 periodically checks if its supply voltage, for example, the voltage across the capacitor 2209, is still sufficiently high. If this is not the case, both switches 2202, 2205 are closed for a short period to recharge the storage capacitor 2209. In this way the controller 2208 and detection circuits 2210 are always powered while the rest of the system is in low-power sleep mode most of the time.

Using normally closed switches 2202, 2205 will alleviate the cold start problem, i.e. when the transmitter is first connected to mains it will be powered completely until the controller 2208 decides that the system should enter the sleep mode, i.e. when no device is present on the transmitter surface.

The system 2200 is woken up when a stimulus 2212 is applied to the transmitter that is detected by detection electronics 2210, which sends a signal to the controller 2208 indicating that the system 2200 should wake up. The controller 2208 will then close both switches 2202, 2205 to power the complete transmitter electronics.

The stimulus 2212 applied should in a wireless power transmitter be indicative of the placement of a receiver device on the transmitter surface. Stimulus detection based on capacitive detection has been described in previous embodiments.

Figure 23:
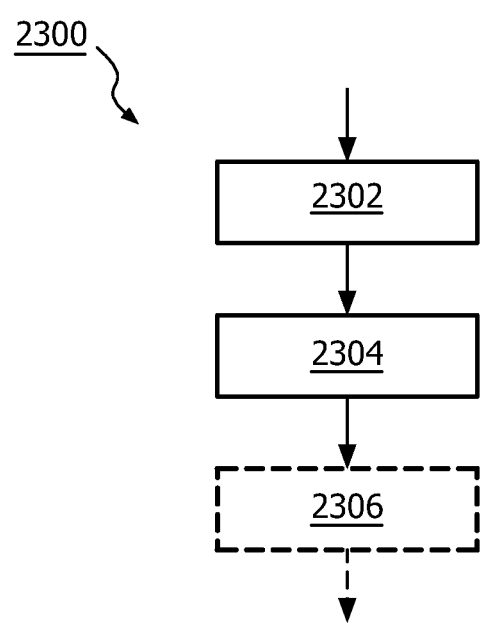

FIG. 23 schematically shows a flow diagram of the method according to the first aspect of the invention. The method is performed by a wireless power transmitter to detect a receiver device. The wireless power transmitter comprises a first electrode of a capacitor and a second electrode of the capacitor. The wireless power transmitter further comprises detection circuitry connected to any one of the electrodes. The method comprises the step 2302 of applying a voltage to another one of the electrodes, and the step 2304 of detecting by a detection circuitry a capacitance change between the capacitor formed by the electrodes. The detected capacitance change may be seen as an event relating to a receiver device. The method may further comprise the step 2306 of waking up a transmission device, being the wireless power transmitter, so that the transmission device is activated to be able to power the receiver device or communicate with the receiver device. In other words, the transmitter is activated.

FIG. 23 may also be used to explain the method 2300 according to the third aspect of the invention. The method 2300 is a method of detecting a receiver by a transmitter. The transmitter is intended to transmit power inductively to the receiver. The transmitter comprises a first transmission coil as an electrode. The electrode forms a capacitor with ground or with the receiver. In a first step 2302 of the method 2300, a voltage is applied to the electrode. In a second step 2304 of the method 2300, a capacitance change of the capacitor is detected.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of detecting a receiver by a transmitter via a capacitance change, the method comprising:
   providing, in the transmitter, a first transmission coil as a first electrode;
   providing, in the transmitter, a second electrode;
   forming a capacitor by the first electrode and the second electrode of the transmitter;
   applying a voltage to any one of the electrodes;
   determining a position of the receiver with respect to the transmitter when the capacitance change of the capacitor is detected based on a current flowing through the capacitor.

2. The method according to claim 1, further comprising providing a second transmission coil in the transmitter, wherein the second transmission coil is the second electrode.

3. The method according to claim 1, further comprising positioning the second electrode of the capacitor in a center of the first transmission coil.

4. The method according to claim 1, wherein a winding of the first transmission coil comprises an inner part of the winding and an outer part of the winding, and wherein the inner part of the winding is the first electrode and the outer part of the winding is the second electrode.

5. The method according to claim 1, wherein the transmitter comprises a plurality of capacitors formed by a plurality of first electrode and second electrode pairs, the method further comprising:
   detecting the capacitance change of each one of the plurality of capacitors, and
   determining the position of the receiver depending on which one of the plurality of capacitors' capacitance change has been detected.

6. The method according to claim 1, wherein the method further comprises activating the transmitter so that the transmitter starts communicating with the receiver or transmitting power to the receiver.

7. A transmitter for detecting a receiver via a capacitance change, the transmitter comprising:
   a first transmission coil as a first electrode;
   a second electrode forming a capacitor with the first electrode;
   a voltage source configured to apply a voltage to any one of the first or second electrodes; and
   a detection circuitry connected to any one of the first or second electrodes for detecting the capacitance change of the capacitor based on a current flowing through the capacitor such that a position of the receiver is determined with respect to the transmitter.

8. The transmitter according to claim 7, further comprising a second transmission coil, wherein the second transmission coil is the second electrode.

9. The transmitter according to claim 7, wherein the second electrode is positioned in a center of the first transmission coil.

10. The transmitter according to claim 9, wherein the transmitter comprises a second unit for activating the transmitter so that the transmitter starts communicating with the receiver or transmitting power to the receiver.

11. A method of detecting a receiver by a transmitter via a capacitance change, the method comprising:
    providing, in the transmitter, a first transmission coil as an electrode;
    applying a voltage to the electrode; and
    detecting a capacitance change of a capacitor based on a current flowing through the capacitor, wherein the capacitor is formed by the electrode and a ground or the capacitor is formed by the electrode and the receiver, such that a position of the receiver is determined with respect to the transmitter.

12. A transmitter for detecting a receiver via a capacitance change, the transmitter comprising:
    a first transmission coil as an electrode,
    a voltage source configured to apply a voltage to the electrode; and
    a detection circuitry connected to the first electrode for detecting the capacitance change of a capacitor based on a current flowing through the capacitor such that a position of the receiver is determined with respect to the transmitter, wherein the capacitor is formed by the electrode and a ground or the capacitor is formed by the electrode and the receiver.

13. The transmitter according to claim 7, wherein a winding of the first transmission coil comprises an inner part of the winding and an outer part of the winding, wherein the inner part of the winding is the first electrode and the outer part of the winding is the second electrode.

14. The transmitter according to claim 7, wherein the transmitter comprises a plurality of capacitors formed by a plurality of first electrode and second electrode pairs, wherein the capacitance change of each one of the plurality of capacitors is detected, and the position of the receiver is determined depending on which one of the plurality of capacitors' capacitance change has been detected.

15. The transmitter according to claim 7, wherein the transmitter is activated so that the transmitter starts to communicate with the receiver or transmit power to the receiver.

* * * * *